J. KRITCH.

Hub for Carriage-Wheels.

No. 8,540. Reissued Jan. 14, 1879.

Witnesses.

W. Dickes

J. J. Philbrick

Inventor.

Jacob Kritch.

Per Burridge & Co.

Attys.

N. PETERS, PHOTO-LITHOGRAPHER, WASHINGTON, D. C.

UNITED STATES PATENT OFFICE

JACOB KRITCH, OF CLEVELAND, OHIO.

IMPROVEMENT IN HUBS FOR CARRIAGE-WHEELS.

Specification forming part of Letters Patent No. 122,323, dated January 2, 1872; Reissue No. 8,540, dated January 14, 1879; application filed October 28, 1878.

*To all whom it may concern:*

Be it known that I, JACOB KRITCH, of Cleveland, in the county of Cuyahoga and State of Ohio, have invented a certain new and Improved Hub for Carriage-Wheels; and I do hereby declare that the following is a full, clear, and complete description thereof, reference being had to the accompanying drawings, making a part of the same.

Figure 1:
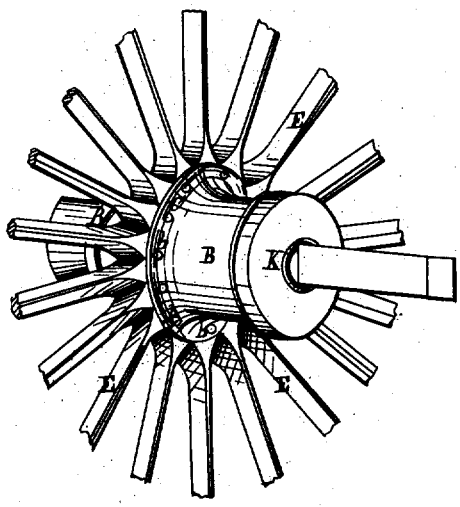
Figure 2:
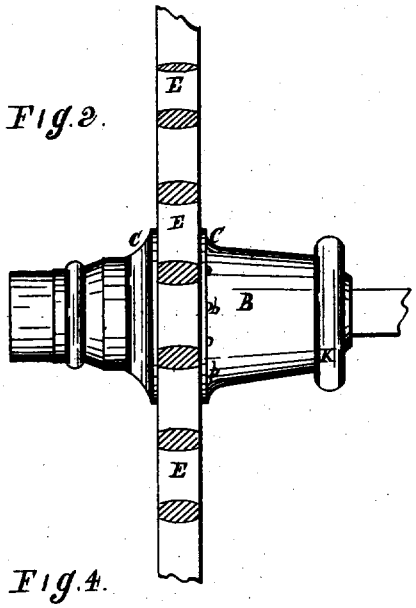
Figure 3:
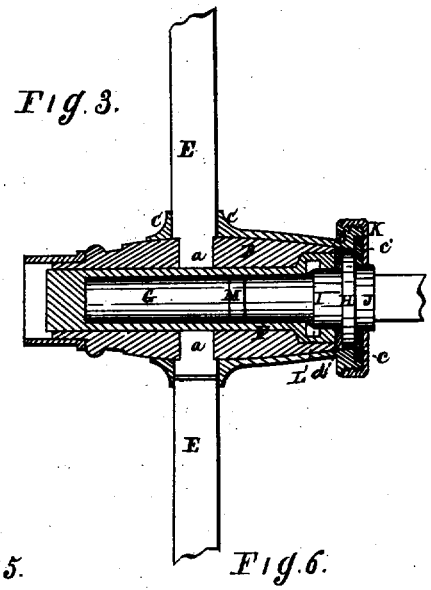
Figure 4:
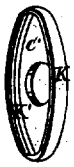
Figure 5:
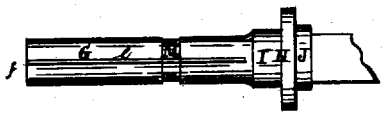
Figure 6:
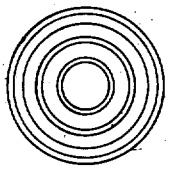

Figure 1 is a perspective view of the wheel. Fig. 2 is a side view. Fig. 3 is a longitudinal section. Fig. 4 is a detached section. Fig. 5 is a detached view of the axle. Fig. 6 is an end view of the inner end of the hub.

Like letters of reference refer to like parts in the several views.

The nature of this invention relates to a carriage-wheel hub; and the object thereof is to secure said hub to the axle or spindle from the inner end by means of a screw-cap passed on over the axle or spindle and screwed onto the end of the hub, substantially in the manner as follows.

In the drawing, Fig. 1 represents the hub having sections of the spokes inserted therein. C, Fig. 2, are circular flanges or collars, between which the bases of the spokes are clamped, whereas the tenons thereof are inserted in the mortises in the wooden hub or core D, Fig. 3, on which are snugly fitted the collars referred to, in which core, and between the collars, the spokes are secured. The collars are secured to each other and in close contact with the sides of the spokes by means of rivets *b*, whereby the spokes are substantially secured in place.

The posterior part of the core is inclosed within the thimble or sleeve B, connected or not with the collar C, on the end of which is a screw, B′, which screw receives the cap K, Fig. 4.

In the axle-box F is fitted the axle G, of which H is the axle-collar, I the enlargement before the collar, and J the enlargement behind said collar. The enlargement I is fitted in the axle-box, whereas the enlargement J is fitted in the screw-cap K, which, it will be seen, is provided with screw-threads K′.

The collar referred to is fitted in the end of the thimble B, onto which thimble is screwed the cap K by means of the screw B′. The posterior side of said collar is flush with the side ends of the thimble, against which and the sides of the collar the leather washer or packing *c* is pressed by the bottom of the chamber *c′* of the cap when the cap is screwed on, as shown in Figs. 3 and 4, the washer preventing the contact of the two metals, that of the posterior side of the collar and the inside of the cap, so that no frictional abrasion or noise will result from the connection of the wheel with the axle. There is also interposed between the anterior side of the collar and the end of the axle-box a leather washer, *d*, for the purpose specified of the washer *c*.

Immediately within the end of the axle-box is cut a chamber, L, Fig. 3, for the retention of the oil or grease, and the groove M around the axle or spindle is for a similar purpose—for lubricating. The end or spindle of the axle is hollow, forming a chamber longitudinally with the spindle, and open at the end and communicating with the outside by one or more small holes, *e*, in the groove *f*, Fig. 5. The purpose of the chamber is for the retention of oil for lubricating, and the groove *f* is to distribute it along the spindle, which renders the hub self-oiling.

It will be obvious from the drawing and the description thereof that the wheel is retained upon the spindle by means of the screw-cap K, which is slipped on over the axle and screwed into the posterior end of the hub, as aforesaid, thereby holding and inclosing the collar H and washers *d c* between itself and the end of the hub, making a neat and secure connection of the wheel to the axle, which is so close fitting as to exclude dirt and dust from the axle-box; hence the wheel will run freely, truly, and noiselessly.

It will be observed that the collar H, being of large diameter, will cause the wheel to run more steadily and with less liability to twist or wrench on the axle than one of small diameter.

What I claim as my invention, and desire to secure by Letters Patent, is—

1. The screw-cap K and shell or thimble B, provided with the screw B′, to receive said cap, and having a chamber, *c′*, between the back of the axle-box and cap K, to receive the large collar H and washer *c*, when applied to wooden hubs in the manner substantially as described, and for the purpose set forth.

2. A wooden hub having a shell or thimble inclosing the posterior end thereof, and said thimble provided with a screw to receive the screw-cap K, and having a chamber, *c'*, between the back of the axle-box and the cap, to receive the large collar H and washer *c*, substantially as described, and for the purpose specified.

JACOB KRITCH.

Witnesses:
J. H. BURRIDGE,
W. H. BURRIDGE.